(12) United States Patent
Fujii

(10) Patent No.: US 9,020,076 B2
(45) Date of Patent: Apr. 28, 2015

(54) COMMUNICATION APPARATUS, METHOD AND SYSTEM

(75) Inventor: Masaaki Fujii, Yokohama (JP)

(73) Assignee: Samsung Electronics Co., Ltd., Suwon-si (KR)

(*) Notice: Subject to any disclaimer, the term of this patent is extended or adjusted under 35 U.S.C. 154(b) by 1301 days.

(21) Appl. No.: 11/764,464

(22) Filed: Jun. 18, 2007

(65) Prior Publication Data

US 2008/0043864 A1     Feb. 21, 2008

(30) Foreign Application Priority Data

Aug. 17, 2006  (JP) ................................ 2006-222708
Nov. 28, 2006  (KR) ........................ 10-2006-0118566

(51) Int. Cl.
    *H04L 27/00*     (2006.01)
    *H04L 25/06*     (2006.01)
    *H04B 7/04*      (2006.01)
    *H04L 1/00*      (2006.01)
    *H04L 25/02*     (2006.01)

(52) U.S. Cl.
    CPC ............ *H04L 25/067* (2013.01); *H04B 7/0413* (2013.01); *H04L 1/0045* (2013.01); *H04L 25/0204* (2013.01)

(58) Field of Classification Search
    USPC ......... 375/260, 267, 295, 298, 308, 316, 324, 375/329, 341
    See application file for complete search history.

(56) References Cited

U.S. PATENT DOCUMENTS

| | | | |
|---|---|---|---|
| 6,724,843 B1 | 4/2004 | Clarkson et al. | |
| 2004/0052317 A1* | 3/2004 | Love et al. | ............... 375/340 |
| 2006/0176971 A1 | 8/2006 | Nissani | |
| 2006/0268963 A1* | 11/2006 | Yoshida | ............... 375/148 |
| 2007/0009016 A1* | 1/2007 | Tsutsui | ............... 375/219 |

(Continued)

FOREIGN PATENT DOCUMENTS

| | | |
|---|---|---|
| EP | EP1521375 A3 | 4/2005 |
| KR | 2006-0097721 A | 9/2006 |
| WO | WO 200507649 A1 | 8/2005 |

OTHER PUBLICATIONS

Windpassinger et al., Low-Complexity Near-Maximum-Likelihood Detection and Precoding for MIMO Systems using Lattice Reduction, IEEE, 2003, pp. 35-348.*

(Continued)

*Primary Examiner* — Freshteh N Aghdam
(74) *Attorney, Agent, or Firm* — Sughrue Mion, PLLC

(57) ABSTRACT

A communication apparatus, method, and system are provided. The communication apparatus receives through a transmission path a combined signal in which modulated signals are combined. The communication apparatus converts a channel matrix indicating transmission characteristics of the transmission path using a basis conversion matrix which converts column vectors forming the channel matrix to cross at right angles, estimates a transmission symbol using the converted channel matrix, and calculates a likelihood of each bit of the estimated transmission symbol being a "1" and a "0", respectively, using an inverse matrix of the basis conversion matrix. The method includes converting a channel matrix; estimating a transmission symbol; and calculating a likelihood of each bit being a "1" and a "0", respectively, of the estimated transmission symbol using a basis conversion matrix. The system includes a transmitter and receiver for transmitting and receiving, respectively, a combined signal according to the method.

15 Claims, 10 Drawing Sheets

(56) References Cited

U.S. PATENT DOCUMENTS

2007/0009057 A1* 1/2007 Ito ................................. 375/262
2007/0121753 A1* 5/2007 McNamara et al. .......... 375/267

OTHER PUBLICATIONS

Windpassinger, From Lattice-Reduction-Aided Detection Towards Maximum-Likelihood Detection in MIMO Systems, Jul. 2003, 5 pages.*

"Decision Feedback Aided Detection Based on Lattice Reduction in MIMO Systems," Xinglin Wang et al., 2006, IEEE Xplore, pp. 1708-1712.

Japanese Office Action issued on Dec. 6, 2012 by the Japanese Patent Office in the corresponding Japanese Patent Application No. 2006-222708.

Silvola, P. et. al. "Suboptimal Soft-Output MAP Detector With Lattice Reduction", IEEE Signal Processing Letters, vol. 13, No. 6, Jun. 2006, pp. 321-324.

* cited by examiner

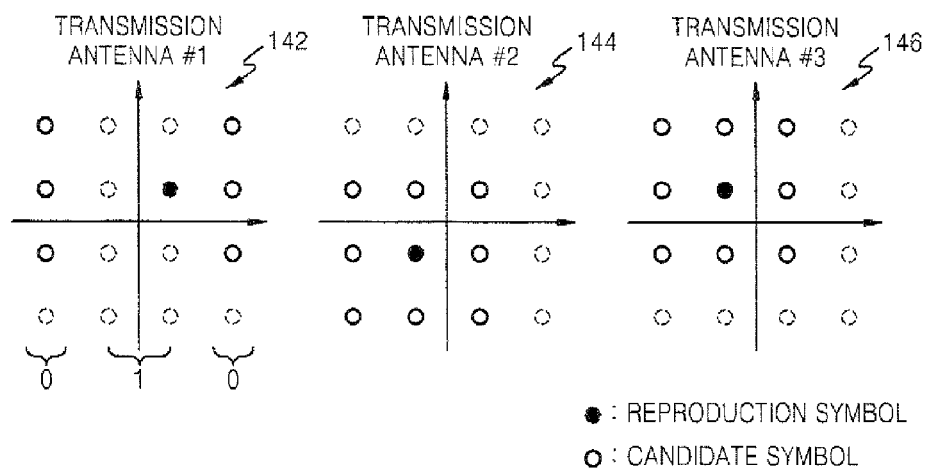
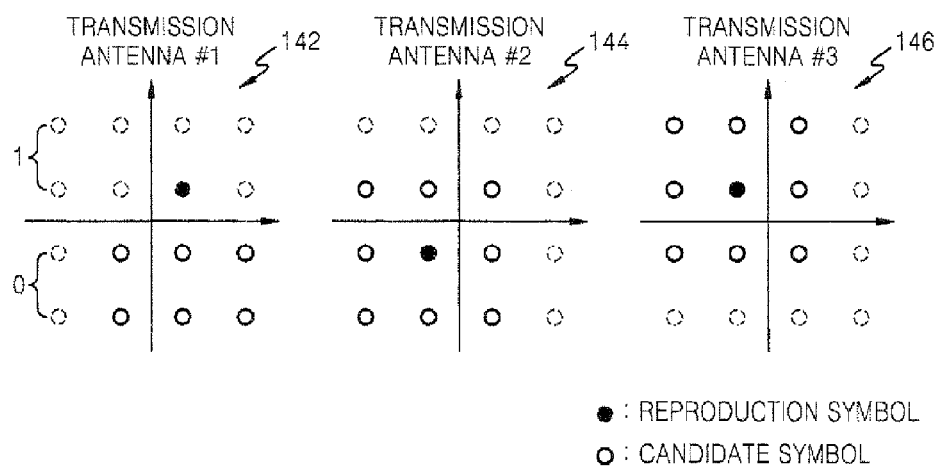

● : REPRODUCTION SYMBOL
○ : CANDIDATE SYMBOL

COMMUNICATION APPARATUS, METHOD AND SYSTEM

CROSS-REFERENCE TO RELATED PATENT APPLICATION

This application claims priority from Japanese Patent Application No. 2006-222708, filed on Aug. 17, 2006, in the Japan Patent Office, and Korean Patent Application No. 10-2006-0118566, filed on Nov. 28, 2006, in the Korean Intellectual Property Office, the disclosures of which are incorporated herein in their entirety by reference.

BACKGROUND OF THE INVENTION

1. Field of the Invention

Apparatuses, methods, and systems consistent with the present invention relate to a wireless communication which operates in a multiple-input multiple-output (MIMO) mode.

2. Description of the Related Art

Signal transmission using a multiple-input multiple-output (MIMO) mode is a high speed wireless communication technology. The MIMO mode is literally based on input/output of a signal using a plurality of antennas. A plurality of transmission data can be simultaneously transmitted at the same time and in the same frequency band using the plurality of antennas in the MIMO mode. When the number of simultaneously transmittable channels increases, wire traffic per unit time also increases by an amount corresponding to the increase in the number of transmittable channels. Accordingly, communication speed can be substantially increased. Also, in the MIMO mode, a frequency band does not increase even when the communication speed increases.

However, since a plurality of modulated signals having a carrier component of the same frequency is simultaneously transmitted, a receiver uses an apparatus for separating modulated signals that interfere with each other. In the MIMO mode, modulated signals are separated using a channel matrix indicating the transmission characteristics of a wireless transmission path. The channel matrix can be detected using, for example, a method of assuming a channel using a pilot symbol, or the like.

However, each signal modulated during transmission may not be reproduced with a high degree of precision in some channel matrices due to noise, etc. Accordingly, several technical improvements to MIMO signal detection are being studied, and various methods of separating signals are being disclosed. For example, in W. Wang, P. Gong, K. Niu, W. Wu, J. Zhang, M. Weckerle, "Decision Feedback Aided Detection Based on Lattice Reduction in MIMO Systems", VTC2006-Spring, Melbourne, May 2006 (hereinafter "Wang et al."), a method of separating modulated signals using a channel matrix obtained by lattice basis reduction is disclosed.

However, using a MIMO signal detection technology disclosed in Wang et al., the likelihood of an estimated modulated signal cannot be calculated at each bit illustrated by the estimated modulated signal.

SUMMARY OF THE INVENTION

Exemplary embodiments of the present invention provide a communication apparatus, method, and system which improve performance of an error correction decode by estimating a modulated signal using a MIMO signal detection technology and calculating the likelihood of the estimated modulated signal at each bit illustrated by the estimated modulated signal.

Exemplary embodiments of the present invention also provide a computer readable recording medium having recorded thereon a program for executing the communication method described above.

According to an aspect of the present invention, there is provided a communication apparatus which receives through a transmission path a combined signal in which a plurality of modulated signals, including transmission symbol information, is combined, the communication apparatus comprising a lattice basis reduction unit which converts a channel matrix indicating transmission characteristics of the transmission path using a basis conversion matrix; a transmission symbol estimation unit which estimates a transmission symbol from the received combined signal using the converted channel matrix and using a certain method; and a bit likelihood calculator which calculates a likelihood of each bit being a "1" and a "0", respectively, of the estimated transmission symbol using an inverse matrix of the basis conversion matrix.

According to another aspect of the present invention, there is provided a communication method for receiving through a transmission path a combined signal in which a plurality of modulated signals, including transmission symbol information, are combined, the communication method comprising converting a channel matrix indicating transmission characteristics of the transmission path using a basis conversion matrix which converts column vectors forming the channel matrix to cross at right angles; estimating a transmission symbol from the received combined signal using the converted channel matrix via a predetermined method; and calculating a likelihood of each bit being a "1" and a "0", respectively, of the estimated transmission symbol using an inverse matrix of the basis conversion matrix.

According to another aspect of the present invention, there is provided a computer readable recording medium having recorded thereon a program for executing a method comprising converting a channel matrix indicating transmission characteristics of the transmission path using a basis conversion matrix which converts column vectors forming the channel matrix to cross at right angles; estimating a transmission symbol from the received combined signal using the converted channel matrix via a certain method; and calculating a likelihood of each bit being a "1" and a "0", respectively, of the estimated transmission symbol using an inverse matrix of the basis conversion matrix.

According to another aspect of the present invention, there is provided a communication system capable of a multiple-input multiple-output (MIMO) transmission, the communication system including a transmitter which generates a plurality of modulated signals modulated using a multi-level modulation method and transmitting the modulated signals using a plurality of transmission antennas; and a receiver which receives a combined signal wherein the modulated signals are combined through a plurality of reception antennas and a transmission symbol included in the modulated signals is estimated from the combined signal, wherein the transmitter includes an error correction decoder which performs a decoding of error correction on each of a plurality of transmission data; a modulated signal generator which generates the modulated signals of each transmission data with an error correction code; and a transmitting unit which transmits the modulated signals using the plurality of transmission antennas, and the receiver includes a receiving unit which receives the combined signal through the plurality of reception antennas; a lattice basis reduction unit which converts a channel matrix indicating transmission characteristics of a transmission path using a basis conversion matrix; a transmission symbol estimation unit which estimates a transmission symbol from the received modulated signal using the converted channel matrix via a certain method; a bit likelihood calculator which calculates a likelihood of each bit being a "1" and a "0", respectively, of the estimated transmission symbol using the basis conversion matrix; and an error correction decoder which performs a decoding of the error correction based on the calculated likelihood.

BRIEF DESCRIPTION OF THE DRAWINGS

The above and other aspects of the present invention will become more apparent by describing in detail exemplary embodiments thereof with reference to the attached drawings in which:

FIGS. 6, 7, 8, and 9 are diagrams for describing how a candidate symbol is selected according to an exemplary embodiment of the present invention;

DETAILED DESCRIPTION OF EXEMPLARY EMBODIMENTS OF THE PRESENT INVENTION

Figure 1:
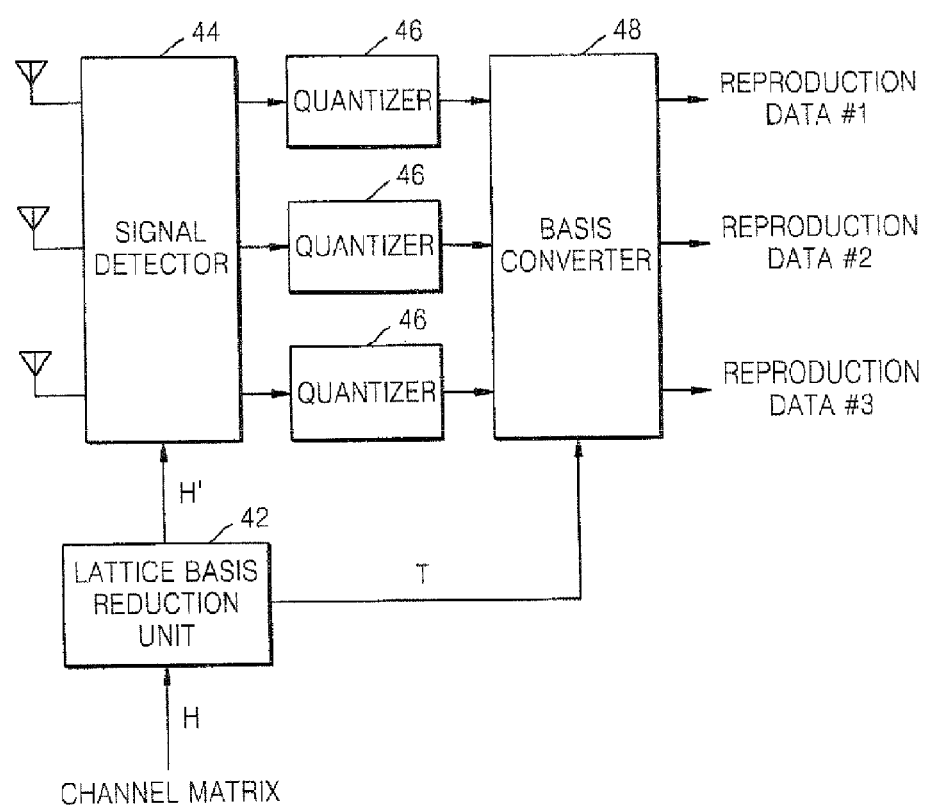
FIG. 1 is block diagram illustrating a related art multiple-input multiple-output (MIMO) signal detection apparatus.

Hereinafter, the present inventive concept will be described more fully with reference to the accompanying drawings, in which exemplary embodiments of the invention are shown. In the drawings, constitutions substantially having the same functions have the same reference numerals in order to avoid repetition.

Before describing the present invention, a related art multiple-input multiple-output (MIMO) signal detection apparatus which detects a signal using a channel matrix obtained by lattice basis reduction, hereinafter referred to as a lattice basis reduced channel matrix, will be described with reference to FIG. 1, in order to clarify the differences between a related art communication apparatus and a communication apparatus according to an exemplary embodiment of the present invention. FIG. 1 is block diagram illustrating a related art MIMO signal detection apparatus.

As illustrated in FIG. 1, the related art MIMO signal detection apparatus mainly includes a lattice basis reduction unit 42, a signal detector 44, quantizers 46, and a basis converter 48.

The lattice basis reduction unit 42 calculates a basis conversion matrix T in order to perform lattice basis reduction on a channel matrix H which indicates the transmission characteristics of a transmission path, and performs lattice basis reduction on the channel matrix H using the basis conversion matrix T. The signal detector 44 extracts a complex symbol component from a received modulated signal and obtains an estimated transmission symbol vector by applying the channel matrix H' obtained by performing lattice basis reduction to a reception symbol vector which includes the complex symbol component of each antenna. The quantizers 46 detect signal points nearest to positions on a complex plane indicated by each component of the generated estimated transmission symbol vector, and uses the detected signal points as the components of a new estimated transmission symbol vector. The basis converter 48 applies the basis conversion matrix T to the new estimated transmission symbol vector in order to obtain an estimated transmission symbol vector on the original basis. As a result, information about a transmission symbol included in each of the transmitted modulated signals is estimated, and thus transmission data is reproduced.

The related art MIMO signal detection apparatus has been described.

Hereinafter, a communication system and a communication apparatus according to an exemplary embodiment of the present invention will be described. Exemplary embodiments of the present invention have a system structure which may include some constitutions that have similar functions as the constitutions of the related art MIMO signal detection apparatus described above. In describing the following exemplary embodiments, descriptions that have already been mentioned with respect to the related art communication system will not be repeated.

Communication System

Figure 2:
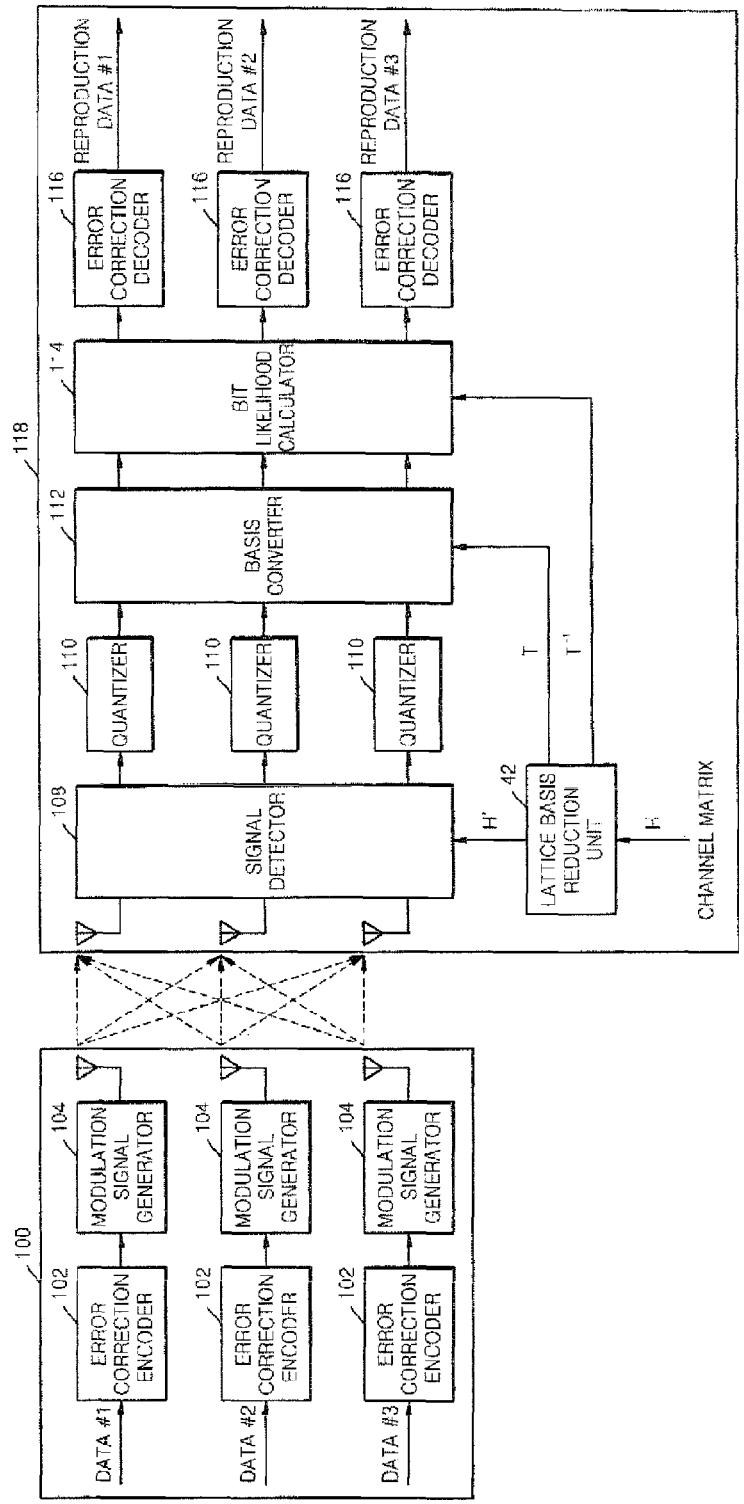
FIG. 2 is a block diagram illustrating a communication system according to an exemplary embodiment of the present invention.

A communication system according to an exemplary embodiment of the present invention will be described with reference to FIG. 2. FIG. 2 is a block diagram illustrating the communication system according to an exemplary embodiment of the present invention.

Referring to FIG. 2, the communication system includes a transmitter 100 and a receiver 118. Referring to FIG. 2, the transmitter 100 and the receiver 118 each include three antennas, but the number of antennas is not limited to three. For example, the transmitter 100 may include $Nt \geq 2$ antennas and the receiver 118 may include $Nr \geq 2$ antennas, wherein $Nt \leq Nr$. Also, Nt may not be equal to Nr.

First, the transmitter 100 will be described.

The transmitter 100 includes error correction encoders 102 and modulated signal generators 104, one of each corresponding to each respective antenna. Also, although not illustrated in FIG. 2, the transmitter 100 may include a central processing unit (CPU), a memory, a magnetic memory device, an optical memory device, etc. In addition, functions of the error correction encoders 102 and the modulated signal generators 104 can be realized by the CPU based on programs recorded in the memory or other memory devices.

The error correction encoders 102 perform error correction encoding on each of a plurality of transmission data, i.e. data #1 through #3. Also, the modulated signal generators 104 map each transmission data with an error correction code as a signal point and generate a plurality of modulated signals by modulating a carrier of each transmission data. Hereinafter, the signal point mapped at each transmission data is called a transmission symbol. The modulated signals are each transmitted through different transmission antennas.

Next, the receiver 118 will be described.

The receiver 118 includes a lattice basis reduction unit 106, a signal detector 108, quantizers 110, a basis converter 112, a bit likelihood calculator 114, and error correction decoders 116. Although not illustrated in FIG. 2, the receiver 118 may include a CPU, a memory, a magnetic memory device, an optical memory device, etc. Also, functions of the lattice basis reduction unit 106, the signal detector 108, the quantizers 110, the basis converter 112, the bit likelihood calculator 114, and the error correction decoders 116 can be realized by the CPU based on programs recorded in the memory or other memory devices.

First, the lattice basis reduction unit 106 will be described.

The lattice basis reduction unit 106 calculates a basis conversion matrix T for basis converting (lattice basis reduction converting) column vectors of a channel matrix H to cross at right angles, and converts the channel matrix H to a lattice basis reduced channel matrix H' (H'=HT) using the basis conversion matrix T. Here, a determinant of the basis conversion matrix T is 1, and the basis conversion matrix T has positive numbers. The basis conversion matrix T can be calculated using a Lenstra-Lenstra-Lovasz (LLL) algorithm. Accordingly, the lattice basis reduction unit 106 calculates the basis conversion matrix T from the channel matrix H using the LLL algorithm, and calculates the lattice basis reduced channel matrix H' by applying the basis conversion matrix T to the channel matrix H. That is, the lattice basis reduction unit 106 has functions of a calculator which calculates the basis conversion matrix T and a converter which performs lattice basis reduction of the channel matrix H. The calculator and the converter included in the lattice basis reduction unit 106 can each be realized separately. When the basis conversion matrix T is calculated by a separate constituent, the lattice basis reduction unit 106 receives the calculated basis conversion matrix T in order to perform lattice basis reduction on the channel matrix H.

Next, the signal detector 108 will be described.

The signal detector 108 extracts a complex signal component from a received modulated signal and obtains an estimated transmission symbol vector by applying the lattice basis reduced channel matrix H' to a reception symbol vector including a complex symbol component of each antenna. That is, the signal detector 108 is a constitution forming a part of a transmission symbol estimation unit (not shown).

Figure 12A:
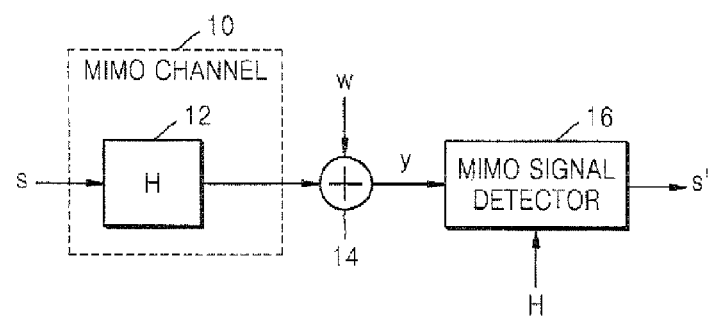
FIGS. 12A and 12B are diagrams for describing a related art multiple-input multiple-output (MIMO) signal detection apparatus.
Figure 12B:
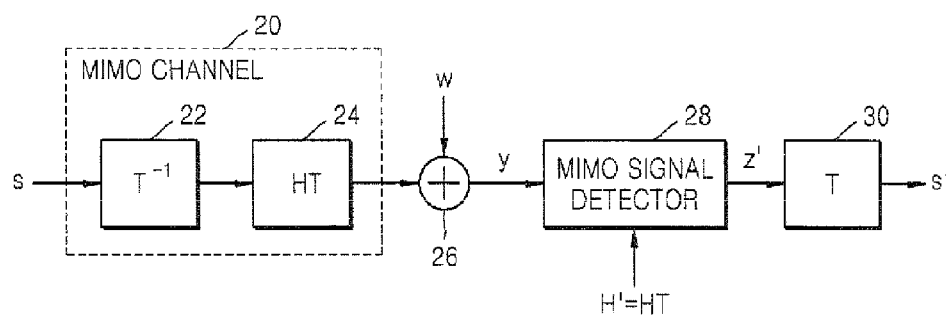

Hereinafter, related art MIMO signal detection using the lattice basis reduction will be described with reference to FIGS. 12A and 12B. FIG. 12A illustrates a related art MIMO signal detector 16 when the lattice basis reduction is not performed, and FIG. 12B illustrates a related art MIMO signal detector 28 when the lattice basis reduction is performed. In FIGS. 12A and 12B, s, s', w, and y indicate vectors and H, H', and T indicate matrixes. Also, $T^{-1}$ is an inverse matrix of matrix T.

First, FIG. 12A will be described.

In FIG. 12A, $s=[s_1, s_2, s_3]^T$ (hereinafter, T denotes a transposition) and is a transmission symbol vector including a complex symbol component (hereinafter, referred to as a transmission symbol) of each modulated signal transmitted. That is, a component $s_i$ (i=1, 2, and 3) of the transmission symbol vector s denotes a transmission symbol indicated by a modulated signal transmitted from an i-th transmission antenna.

In a related art MIMO transmission mode, even when a plurality of transmission antennas each transmits different modulated signals, the modulated signals interfere with each other while passing through a MIMO channel 10, i.e. a wireless transmission path, because the modulated signals, which have carrier components of the same frequency, are simultaneously transmitted from the plurality of transmission antennas. However, in the MIMO transmission mode, each component of a reception symbol vector y that is detected is expressed as a linear combination of each transmission symbol, and thus when the components of the reception symbol vector y maintain the channel matrix H, each transmission symbol can be separated.

The interference of the modulated signals in the MIMO channel 10 is equivalent to a converter 12 applying the channel matrix H to the transmission symbol vector s. Also as shown by reference numeral 14, a noise component w is added to the reception symbol vector y detected by the receiver 118 illustrated in FIG. 2. Accordingly, the reception symbol vector y is Hs+w.

As described above, the receiver 118 of FIG. 2 estimates the transmission symbol vector s using the channel matrix H obtained through channel estimation and obtains an estimated transmission symbol vector s'. The MIMO signal detector 16 for obtaining the estimated transmission symbol vector s' may use, for example, a zero forcing method, a minimum mean square error (MMSE) method, or a combination of a QR decomposition method and a successive interference canceller (SIC) method.

Next, FIG. 12B will be described.

A transmission symbol vector s, a channel matrix H, a noise component w, and a reception symbol vector y, illustrated in FIG. 12B, respectively correspond to the transmission symbol vector s, the channel matrix H, the noise component w, and the reception symbol vector y of FIG. 12A. However, an estimated transmission symbol vector s' illustrated in FIG. 12B may be different from the estimated transmission symbol vector s' of FIG. 12A. This difference is because in the MIMO signal detector 28, a signal is detected using a lattice basis reduced channel matrix H'. Also, T denotes a basis conversion matrix for performing lattice basis reduction on the channel matrix H.

A MIMO channel 20 includes a converter 22 which applies an inverse matrix $T^{-1}$ of the basis conversion matrix T and a converter 24 which applies the lattice basis reduced channel matrix H' (H'=HT). However, from $(HT)(T^{-1}s)=Hs$, the MIMO channel 20 is equivalent to the MIMO channel 10 illustrated in FIG. 12A. That is, when defining a signal vector z, $z=T^{-1}s$, the reception symbol vector y can be $y=(HT)(T^{-1}s)+w=H'z+w$. As a result, the MIMO signal detector 28 calculates an estimated transmission symbol vector z' at a reduced basis, using the lattice basis reduced channel matrix H', and thus a signal can be accurately detected. Also, the MIMO signal detector 28 may use the same methods used for the MIMO signal detector 16. Also, a converter 30 performs a conversion on the estimated transmission symbol vector z' from the reduction basis using the basis conversion matrix T, to obtain the estimated transmission symbol vector s' at the original basis.

A related art MIMO signal detection using a lattice basis reduction has been described, and the communication system and the communication apparatus according to an exemplary embodiment of the present invention is based on the MIMO signal detector 28 illustrated in FIG. 12B. Also, the number of components of the transmission symbol vector s is 3, which corresponds to the number of transmission antenna of the communication system of FIG. 2. However, the number of components of the transmission symbol vector s is not limited to 3, and can be suitably changed based on the number of transmission antennas.

Next, the quantizers 110 as shown in FIG. 2 will be described.

The quantizers 110 determine a new estimated transmission symbol vector by quantizing each component of the estimated transmission symbol vector detected by the signal detector 108 to correspond to signal points disposed in a lattice form. Here, the quantizers 110 select signal points nearest to positions on a complex plane indicated by each component of the generated estimated transmission symbol and the signal points become components of the new estimated transmission symbol vector. Generally, each of the components of the estimated transmission symbol vector detected by the signal detector 108 are assumed to be a non-positive number for all in-phase components and quadrature-phase components due to the effects of noise, etc. Accordingly, the quantizers 110 perform the quantization in order to remove the effects of noise, etc. Hereinafter, the quantized estimated transmission symbol vector shall be called a lattice point vector.

Next, the basis converter 112 will be described.

The basis converter 112 converts the lattice point vector to an original basis using the basis conversion matrix calculated in the lattice basis reduction unit 106. Hereinafter, the estimated transmission symbol vector converted to the original basis shall be called a reproduction symbol vector.

Next, a bit likelihood calculator 114 will be described.

The bit likelihood calculator 114 calculates the likelihood of each bit of the reproduction symbol vector being a "1" and a "0", respectively, based on a condition using the basis conversion matrix calculated by the lattice basis reduction unit 106. The condition may be predetermined. In detail, the bit likelihood calculator 114 selects a candidate of a signal point used in a likelihood calculation as a candidate symbol based on the reproduction symbol vector and calculates the likelihood based on the candidate symbol. Here, the bit likelihood calculator 114 applies the basis conversion matrix to a candidate symbol vector having the candidate symbol as a component in order to generate a candidate symbol vector at a reduction basis. Also, the bit likelihood calculator 114 calculates the likelihood of bits of respective components of the reproduction symbol vector from the candidate symbol vector, the estimated transmission symbol vector, and the lattice point vector based on the reduction basis. In detail, the bit likelihood calculator 114 calculates a square error of the lattice point vector and a minimum square error of the candidate symbol vector against the estimated transmission symbol vector in order to make differences of each square error as the likelihood. Accordingly, the candidate symbol vector selected for each bit is used in order to calculate the likelihood of each bit being a "1" and a "0", respectively.

Next, the error correction decoder 116 will be described.

The error correction decoder 116 performs decoding of error correction based on the likelihood of each bit being a "1" and a "0", respectively, calculated by the bit likelihood calculator 114.

As described above, the communication system according to an exemplary embodiment of the present invention detects a MIMO signal using a lattice basis reduced channel matrix, and selects a candidate symbol vector based on an obtained estimated transmission symbol vector. Also, the communication system converts the selected candidate symbol vector to a reduction basis and calculates the likelihood of each bit used in decoding of error correction being a "1" and a "0", respectively. Accordingly, the performance of encoding and decoding used in error correction can be improved. As a result, by applying the communication system according to an exemplary embodiment of the present invention, communication quality may be increased.

Communication Apparatus

Figure 3:
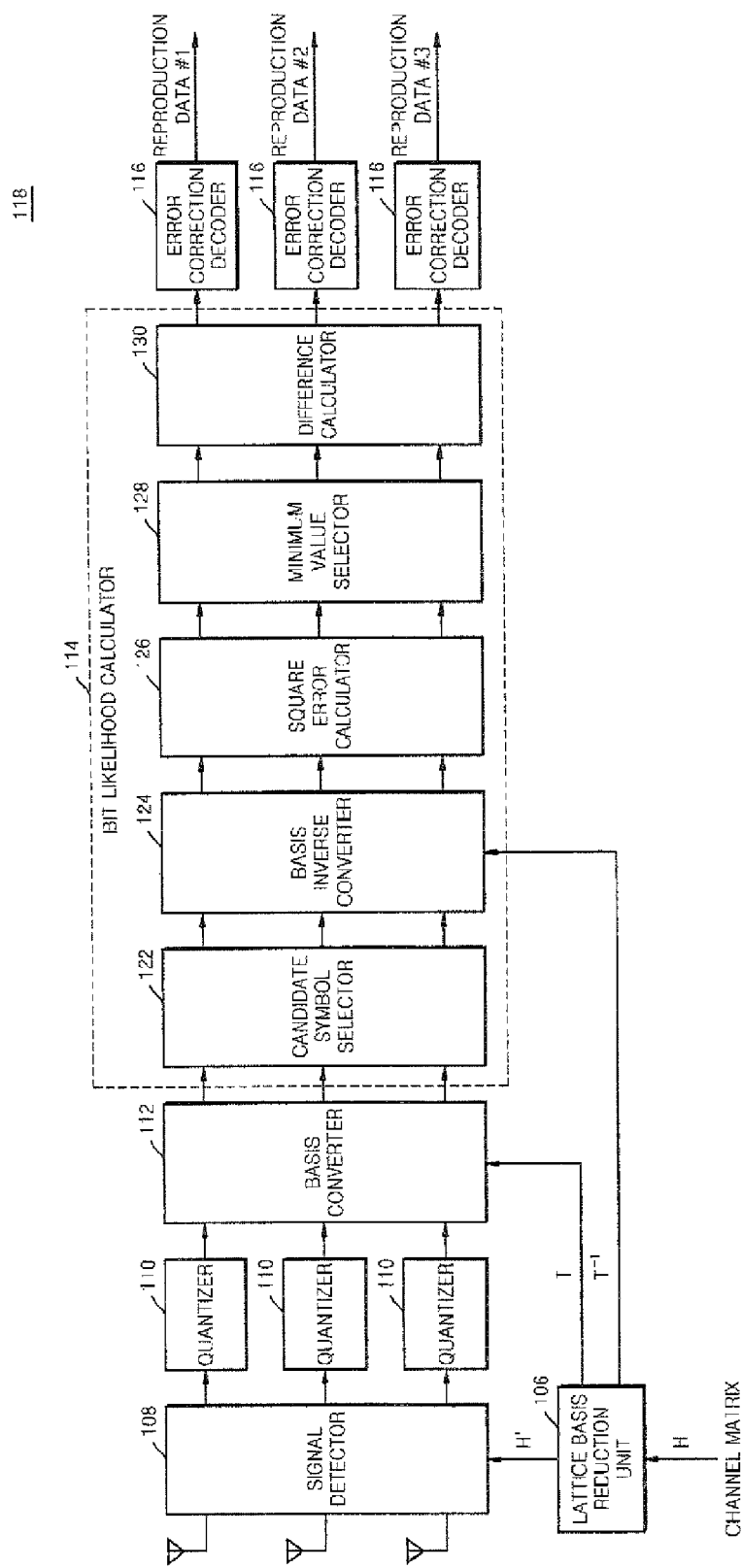
FIG. 3 is a block diagram illustrating a communication apparatus according to an exemplary embodiment of the present invention.

Hereinafter, a communication apparatus 118 according to an exemplary embodiment of the present invention will be described with reference to FIG. 3. FIG. 3 is a block diagram illustrating the communication apparatus 118 according to an exemplary embodiment of the present invention. The communication apparatus 118 corresponds to the receiver 118 included in the communication system illustrated in FIG. 2. Besides the constitutions described below, other constitutions for realizing functions of a transmitter are possible. In such a case, the other constitutions are called a transmitter.

Referring to FIG. 3, the communication apparatus 118 according to an exemplary embodiment of the present invention includes a lattice basis reduction unit 106, a signal detector 108, quantizers 110, a basis converter 112, a bit likelihood calculator 114, and an error correction decoder 116. The constitutions of all these elements except the bit likelihood calculator 114 have been described above with respect to the communication system. Accordingly, a detailed description about these constitutions will be omitted and the bit likelihood calculator 114 will be described in detail.

Before describing the bit likelihood calculator 114, each signal vector generated in the preceding portion will be briefly described.

(1) A transmission symbol vector is a signal vector having a transmission symbol indicated by a complex symbol component of a modulated signal transmitted from each transmission antenna. That is, an i-th component of the transmission symbol vector is a complex symbol component of a modulated signal transmitted from an i-th transmission antenna.

(2) A reception symbol vector is a signal vector having a reception symbol indicated by a complex symbol component of a modulated signal received from each reception antenna. That is, an i-th component of the reception symbol vector is a complex symbol component of a modulated signal received from an i-th reception antenna.

(3) An estimated transmission symbol vector is a transmission symbol vector generated using a channel matrix lattice basis reduced by the signal detector 108. For example, the estimated transmission symbol vector may be a signal vector obtained by applying an inverse matrix of the lattice basis reduced channel matrix to the reception symbol vector. Also, the estimated transmission symbol vector may be a signal vector at a reduction basis. Also, each component of the estimated transmission symbol vector will be called an estimated transmission symbol.

(4) A lattice point vector is a signal vector in which each component of the estimated transmission symbol vector is quantized by the quantizer 110. That is, each component of the lattice point vector is a lattice point symbol indicating a signal point nearest to each estimated transmission symbol.

(5) A reproduction symbol vector is a signal vector in which the lattice point vector is basis converted to an original basis by the basis converter 112. Each component of the reproduction symbol vector will be called a reproduction symbol.

Also, a basis conversion matrix calculated by the lattice basis reduction unit 106 will be just called a basis conversion matrix, and a conversion basis defined by the basis conversion matrix is called a reduction basis. Also, a basis before the basis conversion is called an original basis. Hereinafter, the bit likelihood calculator 114 will be described using the above terms.

The bit likelihood calculator 114 includes a candidate symbol selector 112, a basis inverse converter 124, a square error calculator 126, a minimum value selector 128, and a difference calculator 130.

The candidate symbol selector 122 will now be described.

The candidate symbol selector 122 selects a candidate symbol vector for calculating a likelihood under a condition using the reproduction symbol vector. The condition may be predetermined.

In detail, the candidate symbol selector 122 selects a reproduction symbol from among each component of the reproduction symbol vector. Then, the candidate symbol selector 122 notices a bit from among bits included in the selected reproduction symbol. Next, the candidate symbol selector 122 extracts a signal point including a logical negation bit of the noticed bit, and selects the extracted signal point as a candidate symbol corresponding to the selected reproduction symbol. Also, the candidate symbol selector 122 selects another reproduction symbol from among each component of the reproduction symbol vector. The candidate symbol selector 122 selects a signal point near the other reproduction symbol as a candidate symbol corresponding to the other reproduction symbol. Lastly, the candidate symbol selector 122 determines a candidate symbol vector having a candidate symbol corresponding to the selected reproduction symbol and a candidate symbol corresponding to the other reproduction symbol.

Figure 4:
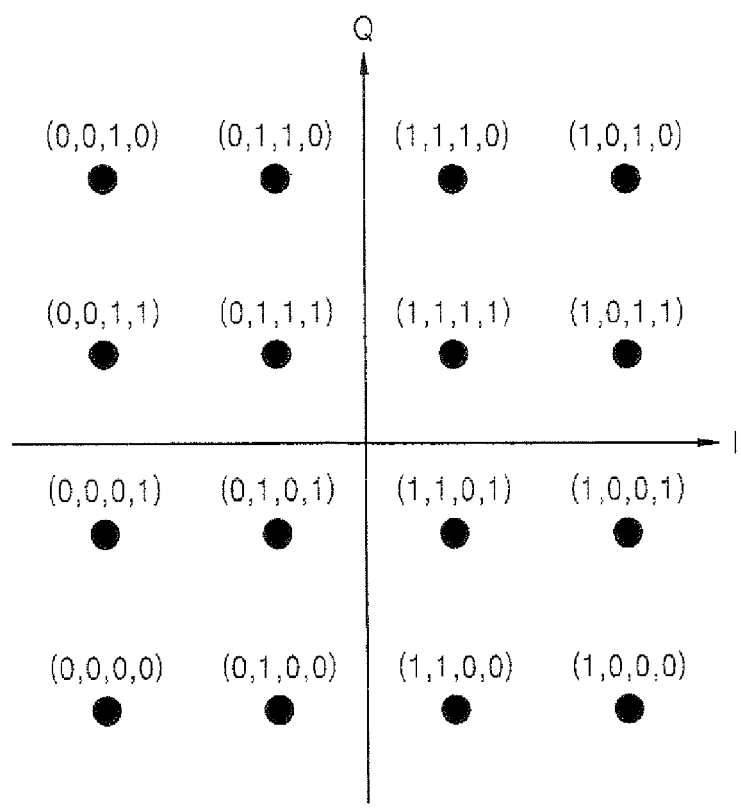
FIG. 4 is a diagram illustrating a signal point constellation in 16 quadrature amplitude modulation (QAM)

Hereinafter, processes of selecting the candidate symbol vector will be described with reference to FIGS. 4 through 9. In the exemplary embodiment, 16 quadrature amplitude modulation (QAM) having a signal point constellation in a lattice form illustrated in FIG. 4 is used as a modulation mode. However, the modulation mode is not limited thereto, and other multi-level modulation mode can be used.

FIG. 4 is a diagram illustrating the signal point constellation in 16 QAM, and bits corresponding to each signal point disposed in a lattice form. The point $(k_1, k_2, k_3, k_4)$ shows that an i-th bit is $k_i$, wherein i is 1, 2, 3, or 4 and $k_i$ is 0 or 1. Also, the horizontal axis I denotes an in-phase component and the vertical axis Q denotes a quadrature-phase component. The processes of selecting the candidate symbol vector will be described based on the relationship between signal points and respective bits corresponding the signal points.

Figure 5:
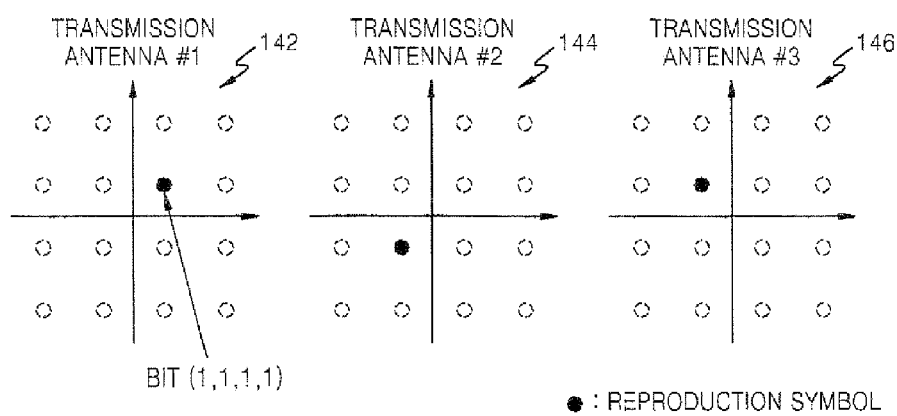
FIG. 5 is a diagram illustrating reproduction symbol constellations according to an exemplary embodiment of the present invention.

Processes of obtaining a reproduction symbol vector in a signal point constellation illustrated in FIG. 5 will be described. Referring to FIG. 5, reproduction symbols corresponding to each transmission antenna are illustrated with black circles (●). For example, a reproduction symbol corresponding to a transmission antenna #1 is bit (1, 1, 1, 1), a reproduction symbol corresponding to a transmission antenna #2 is bit (0, 1, 0, 1), and a reproduction symbol corresponding to a transmission antenna #3 is bit (0, 1, 1, 1). Also, circles illustrated with dotted lines indicate positions of other signal points in order to clarify relationships of reproduction symbol positions.

Upon obtaining the reproduction symbol vector, the candidate symbol selector 122 selects a reproduction symbol noticed by a component of the reproduction symbol vector. Here, the candidate symbol selector 122 selects a first reproduction symbol (hereinafter, referred to as a reproduction symbol 1) corresponding to the transmission antenna #1 as the noticed reproduction symbol. As described above, the reproduction symbol 1 is bit (1, 1, 1, 1).

Figure 6:
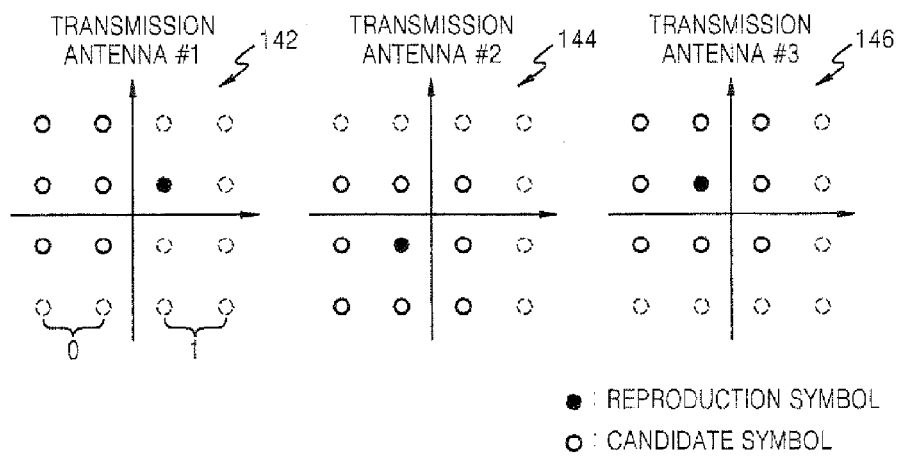

Hereinafter, processes of selecting a candidate symbol corresponding to a first bit of the reproduction symbol 1 will be described with reference to FIG. 6.

The candidate symbol selector 122 notices the first bit (1) of the reproduction symbol 1 and extracts a signal point including a logical negation bit (0) of the first bit. Referring to FIG. 4, signal points in which a first bit is 0 are included in a second quadrant and a third quadrant. Accordingly, the candidate symbol selector 122 selects a signal point near the reproduction symbol 1 from among the signal points included in the second and third quadrant as a candidate symbol corresponding to the first bit of the reproduction symbol 1. For example, as illustrated in a signal point constellation 142 of FIG. 6, the candidate symbol selector 122 selects 6 signal points of the signal points illustrated with circles (○) as a candidate symbol corresponding to the reproduction symbol 1.

Then, the candidate symbol selector 122 notices a reproduction symbol corresponding to the transmission antenna #2 (hereinafter, referred to as a reproduction symbol 2), and selects a signal point near the reproduction symbol 2 as a candidate symbol corresponding to the reproduction symbol 2. For example, as illustrated in a signal point constellation 144 of FIG. 6, the candidate symbol selector 122 may select the reproduction symbol 2, and 8 signal points around the reproduction symbol 2 as candidate symbols corresponding to the reproduction symbol 2.

Similarly, the candidate symbol selector 122 notices a reproduction symbol corresponding to the transmission antenna #3 (hereinafter, referred to as a reproduction symbol 3), and selects a signal point near the reproduction symbol 3 as a candidate symbol corresponding to the reproduction symbol 3. For example, as illustrated in a signal point constellation 146 of FIG. 6, the candidate symbol selector 122 may select the reproduction symbol 3, and 8 signal points around the reproduction symbol 3 as candidate symbols corresponding to the reproduction symbol 3.

As described above, the candidate symbol selector 122 selects candidate symbols corresponding to each reproduction symbol on the first bit of the reproduction symbol 1. In FIG. 6, the candidate symbol selector 122 selects the 6 candidate symbols corresponding to the reproduction symbol 1, the 9 candidate symbols corresponding to the reproduction symbol 2, and 9 candidate symbols corresponding to the reproduction symbol 3. Accordingly, the number of candidate symbol vectors selected by combining the candidate symbols is 6×9×9=486. That is, the candidate symbol selector 122 selects 486 candidate symbol vectors corresponding to the first bit of the reproduction symbol 1.

Hereinafter, processes of selecting a candidate symbol corresponding to a second bit of the reproduction symbol 1 will be described with reference to FIG. 7.

First, the candidate symbol selector 122 notices the second bit (1) of the reproduction symbol 1 and extracts signal points including a logical negation bit (0) of the second bit. Referring to FIG. 4, the signal points in which the second bit is 0 are included in the right column and the left column. Accordingly, the candidate symbol selector 122 selects a signal point near the reproduction symbol 1 from among the signal points included in the left column and the right column as candidate symbols corresponding to the second bit of the reproduction symbol 1. For example, as illustrated in a signal point constellation 142 of FIG. 7, the candidate symbol selector 122 selects 6 signal points illustrated with circles (○) as candidate symbols corresponding to the reproduction symbol 1.

Next, the candidate symbol selector 122 notices the reproduction symbol 2 and selects signal points near the reproduction symbol 2 as candidate symbols corresponding to the reproduction symbol 2. For example, as illustrated in a signal point constellation 144 of FIG. 7, the candidate symbol selector 122 selects the reproduction symbol 2, and 8 signal points around the reproduction symbol 2 as candidate symbols corresponding to the reproduction symbol 2.

Similarly, the candidate symbol selector 122 notices the reproduction symbol 3 and selects signal points near the reproduction symbol 3 as candidate symbols corresponding to the reproduction symbol 3. For example, as illustrated in a signal point constellation 146 of FIG. 7, the candidate symbol selector 122 selects the reproduction symbol 3, and 8 signal points around the reproduction symbol 3 as candidate symbols corresponding to the reproduction symbol 3.

As described above, the candidate symbol selector 122 selects candidate symbols corresponding to each reproduction symbol on the second bit of the reproduction symbol 1.

Hereinafter, processes of selecting a candidate symbol corresponding to a third bit of the reproduction symbol 1 will be described with reference to FIG. 8.

First, the candidate symbol selector 122 notices a third bit (1) of the reproduction symbol 1 and extracts signal points including a logical negation bit (0) of the third bit. Referring to a signal point constellation 142 of FIG. 8, signal points in which the third bit is 0 are included in a third quadrant and a fourth quadrant. Accordingly, the candidate symbol selector 122 selects signal points near the reproduction symbol 1 from among the signal points included in the third and fourth quadrants as candidate symbols corresponding to the third bit of the reproduction symbol 1. For example, as illustrated in the signal point constellation 142 of FIG. 8, the candidate symbol selector 122 selects 6 signal points illustrated with circles (○) as candidate symbols corresponding to the reproduction symbol 1.

Next, the candidate symbol selector 122 notices the reproduction symbol 2, and selects signal points near the reproduction symbol 2 as candidate symbols corresponding to the reproduction symbol 2. For example, as illustrated in a signal point constellation 144 of FIG. 8, the candidate symbol selector 133 selects the reproduction symbol 2 and 8 signal points around the reproduction symbol 2 as candidate symbols corresponding to the reproduction symbol 2.

Similarly, the candidate symbol selector 122 notices the reproduction symbol 3 and selects signal points near the reproduction symbol 3 as candidate symbols corresponding to the reproduction symbol 3. For example, as illustrated in signal point constellation 146 of FIG. 8, the candidate symbol selector 122 selects the reproduction symbol 3 and 8 signal points around the reproduction symbol 3 as candidate symbols corresponding to the reproduction symbol 3.

As described above, the candidate symbol selector 122 selects candidate symbols corresponding to each reproduction symbol on the third bit of the reproduction symbol 1.

Figure 9:
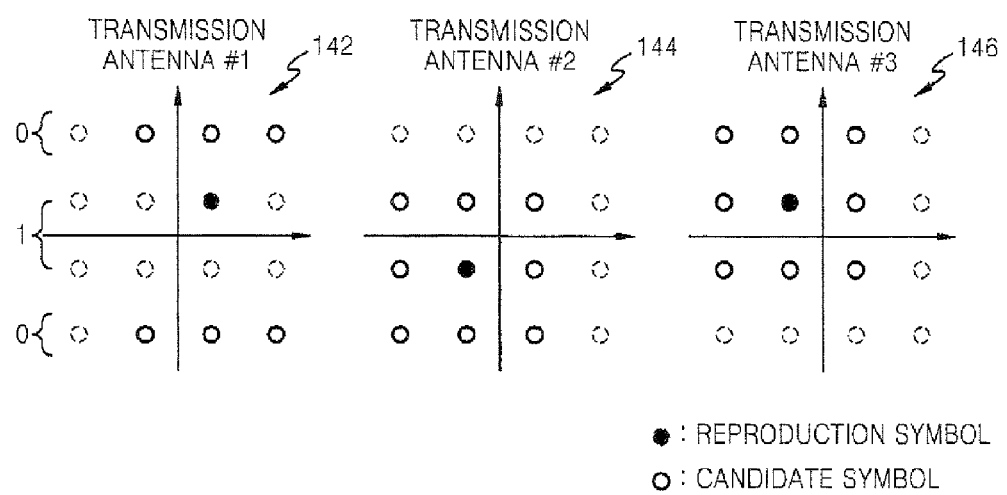

Hereinafter, processes of selecting a candidate symbol corresponding to a fourth bit of the reproduction symbol 1 will be described with reference to FIG. 9.

First, the candidate symbol selector 122 notices the fourth bit (1) of the reproduction symbol 1 and extracts signal points including a logical negation bit (0) of the fourth bit. Referring to a signal point constellation 142 of FIG. 9, signal points in which the fourth bit is 0 are included in an upper column and a lower column. Accordingly, the candidate symbol selector 122 selects signal points near the reproduction symbol 1 from among the signal points included in the upper column and the lower column as candidate symbols corresponding to the fourth bit of the reproduction symbol 1. For example, as illustrated in the signal point constellation 142 of FIG. 9, the candidate symbol selector 122 selects 6 signal points illustrated with circles (○) as candidate symbols corresponding to the reproduction symbol 1.

Next, the candidate symbol selector 122 notices the reproduction symbol 2 and selects signal points near the reproduction symbol 2 as candidate symbols corresponding to the reproduction symbol 2. For example, as illustrated in a signal point constellation 144 of FIG. 9, the candidate symbol selector 122 selects the reproduction symbol 2 and 8 signal points around the reproduction symbol 2 as candidate symbols corresponding to the reproduction symbol 2.

Similarly, the candidate symbol selector 122 notices the reproduction symbol 3 and selects signal points near the reproduction symbol 3 as candidate symbols corresponding to the reproduction symbol 3. For example, as illustrated in a signal point constellation 146 of FIG. 9, the candidate symbol selector 122 may select the reproduction symbol 3 and 8 signal points around the reproduction symbol 3 as candidate symbols corresponding to the reproduction symbol 3.

As described above, the candidate symbol selector 122 selects candidate symbols corresponding to each reproduction symbol on the fourth bit of the reproduction symbol 1.

The candidate symbol selector 122 can select a plurality of candidate symbols for bits indicated by one selected reproduction symbol. Also, the candidate symbol selector 122 selects a plurality of candidate symbols for each reproduction symbol included in a reproduction symbol vector, and selects a candidate symbol vector by combining the candidate symbols. The processes of selecting the candidate symbol vector about the reproduction symbol 1 have been described, and the candidate symbol selector 122 can select a candidate symbol vector of other reproduction symbols by extracting signal points including a logical negation bit in each bit.

Hereinafter, the basis inverse converter 124 will be described with reference again to FIG. 3.

The basis inverse converter 124 basis converts the candidate symbol vector selected by the candidate symbol selector 122 using the inverse matrix of the basis conversion matrix calculated by the lattice basis reduction unit 106. That is, the basis inverse converter 124 basis converts the candidate symbol vector selected in the original basis to a candidate symbol vector of the reduction basis. By performing the basis conversion, the bit likelihood calculator 114 can directly compare the candidate symbol vector and the estimated transmission symbol vector in the reduction basis.

Next, the square error calculator 126 will be described.

The square error calculator 126 calculates a square error of the lattice point vector by calculating a square of a distance between the lattice point vector and the estimated transmission symbol vector, and simultaneously calculates a square error of each candidate symbol vector by calculating a square of a distance between each candidate symbol vector and the estimated transmission symbol vector.

Next, the minimum value selector 128 will be described.

The minimum value selector 128 selects a minimum square error of a candidate symbol vector from among the square errors of each candidate symbol vector calculated by the square error calculator 126 in order to determine the minimum square error. Here, the minimum value selector 128 selects the minimum square error of the candidate symbol vector corresponding to the bit of the noticed reproduction symbol.

Next, the difference calculator 130 will be described.

The difference calculator 130 calculates a difference between the square errors of the lattice point vector and the minimum square error of the candidate symbol vector in order to determine the likelihood of the bit of the noticed reproduction symbol being a "1" and a "0", respectively.

Each vector is defined as follows, and a processes of calculating the likelihood from the lattice point vector and the candidate symbol vector will be described in detail.

Lattice Point Vector: $\bar{q}=[q_1,q_2,q_3]^T$

Candidate Symbol Vector: $\bar{p}=[p_1,p_2,p_3]^T$

Estimated Transmission Symbol Vector: $\bar{z}=[z_1,z_2,z_3]^T$

Candidate Symbol Vector in Lattice-Reduced Basis:
$\bar{p}'=T^{-1}\bar{p}$

Here, $T^{-1}$ denotes the inverse matrix of the basis conversion matrix calculated by the lattice basis reduction unit 106.

As described above, the candidate symbol selector 122 selects candidate symbol vectors of bits indicated by each reproduction symbol. For example, as illustrated in FIG. 6, when the first bit (1) of the reproduction symbol 1 is noticed, the candidate symbol vectors are signal vectors having candidate symbols selected from among signal points in which the first bit is 0 and candidate symbols selected from among signal points around the reproduction symbols 2 and 3. A group of these candidate symbol vectors can be defined as candidate symbol vectors of the first bit of the reproduction symbol 1.

Here, processes of calculating the likelihood of the first bit of the reproduction symbol 1 will be described as an example of a likelihood calculation method.

First, the square error calculator 126 calculates an error of the lattice point vector using Equation 1 below, by calculating a difference between the lattice point vector and the estimated transmission symbol vector. Also, the square error calculator 126 calculates a square error of the lattice point vector defined by Equation 2 below. In addition, the square error calculator 126 calculates an error of each candidate symbol vector using Equation 3 below, and simultaneously, calculates a square error of each candidate symbol vector using Equation 4 below.

Error of Lattice Point Vector: $\bar{e}_1=\bar{q}-\bar{z}$ (1)

Square Error of Lattice Point Vector: $|\bar{e}_1|^2$ (2)

Error of Candidate Symbol Vector: $\bar{e}(\bar{p})=\bar{p}^1-\bar{z}$ (3)

Square Error of Candidate Symbol Vector: $|\bar{e}(\bar{p})|^2$ (4)

Next, the minimum value selector 128 calculates the minimum square error of the candidate symbol vectors by comparing square errors of candidate symbol vectors of the first bit of the reproduction symbol 1 as shown in Equation 5. Also, the difference calculator 130 calculates the likelihood of the first bit of the reproduction symbol 1 as shown in Equation 6 or Equation 7.

Minimum Square Error of Candidate Symbol Vector: (5)
$|\bar{e}_0|^2 = \min_{\bar{p}} \|\bar{e}(\bar{p})\|^2$ Likelihood: $\lambda = |\bar{e}_1|^2 - |\bar{e}_0|^2$ (6)

Likelihood: $\lambda = \sqrt{|\bar{e}_1|^2} - \sqrt{|\bar{e}_0|^2}$ (7)

As described above, the bit likelihood calculator 114 according to an exemplary embodiment of the present invention can select candidate symbols, used in calculating the likelihood of each bit being a "1" of bits of each reproduction symbol based on the reproduction symbol vectors obtained via the MIMO signal detection, etc. Also, candidate symbol vectors obtained by combining the selected candidate symbols can be converted to candidate symbol vectors in the reduction basis and the minimum square error of the estimated transmission vectors can be calculated. As a result, the likelihood of each bit of each reproduction symbol being a "1" and a "0", respectively, can be calculated by comparing the square error of the lattice point vectors and the minimum square error of the candidate symbol vectors of the estimated transmission symbol vectors.

Next, a communication apparatus according to another exemplary embodiment of the present invention will be described. Elements of the communication apparatus that have substantially the same constitution as each other are denoted by the same reference numerals, and descriptions of such elements will not be repeated. Accordingly, only elements having different constitutions will be described in detail.

Figure 10:
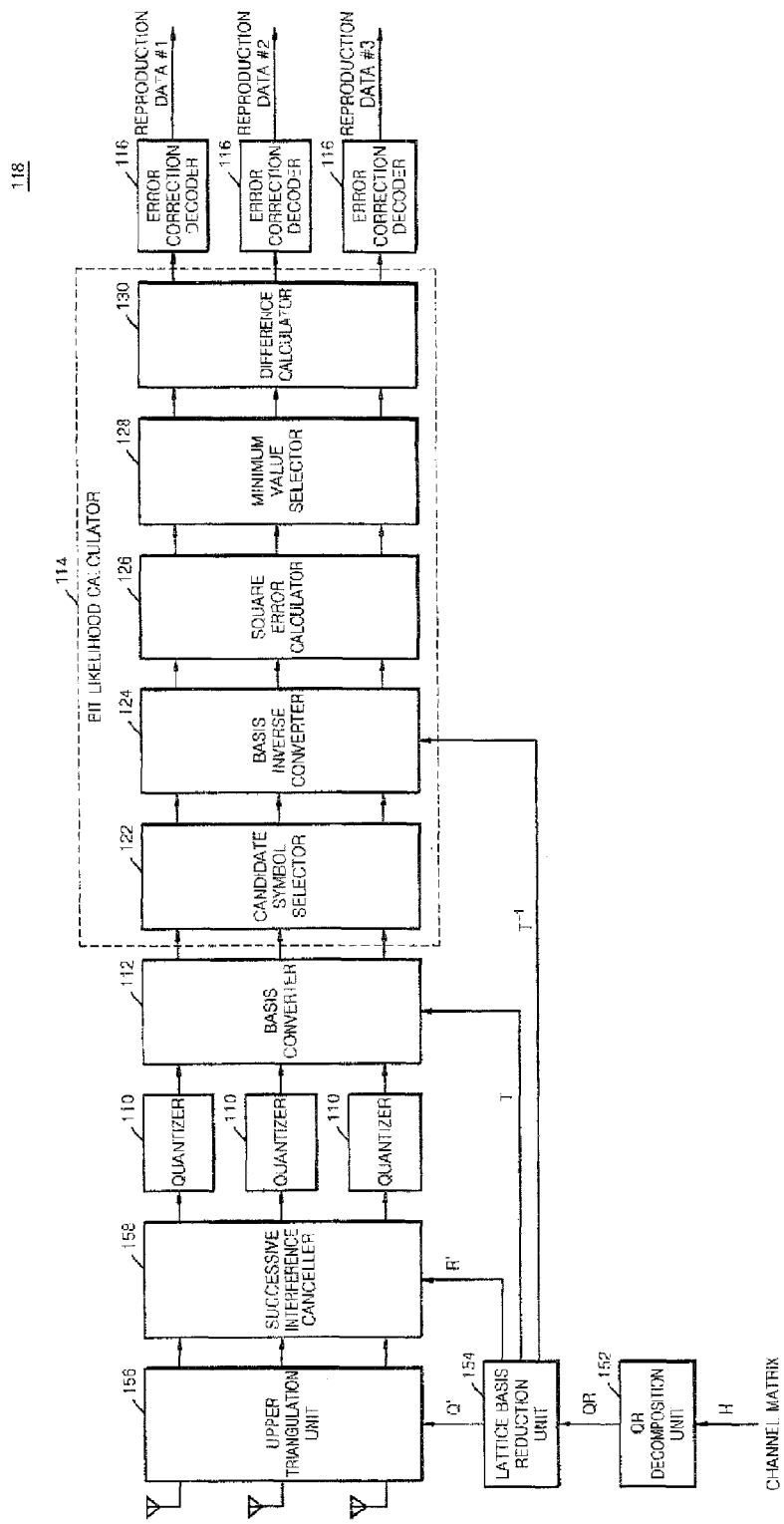
FIG. 10 is a block diagram illustrating a communication apparatus according to another exemplary embodiment of the present invention.

First, a communication apparatus 118 will be described with reference to FIG. 10. FIG. 10 is a block diagram illustrating the communication apparatus 118 according to another exemplary embodiment of the present invention.

Referring to FIG. 10, the communication apparatus 118 includes a QR decomposition unit 152, a lattice basis reduction unit 154, a upper triangulation unit 156, a successive interference canceller 158, quantizers 110, a basis converter 112, a bit likelihood calculator 114, and error correction decoders 116. Since the quantizers 110, the basis converter 112, the bit likelihood calculator 114, and the error correction decoders 116 have similar constitutions as those of the previous embodiment, detailed descriptions thereof will be omitted.

Hereinafter, the QR decomposition unit 152 will be described.

The QR decomposition unit 152 QR decomposes a channel matrix H using Equation 8, shown below, in order to calculate a unit matrix Q and an upper triangular matrix R. The QR decomposition can be performed using any known method, such as Givens rotation, a householder transformation, or Gram-Schmidt decomposition, etc.

Next, the lattice basis reduction unit 154 will be described.

The lattice basis reduction unit 154 calculates a basis conversion matrix T for performing lattice basis reduction on the channel matrix H, performs lattice basis reduction on the unit matrix Q and the upper triangular matrix R calculated by the QR decomposition unit 152 using the basis conversion matrix T, and calculates a new unit matrix Q' and a new upper triangular matrix R'. The lattice basis reduced channel matrix H' can be obtained using Equation 9, shown below, using the lattice basis reduced unit matrix Q' and the lattice basis reduced upper triangular matrix R'.

$H=QR$ (8)

$H'=Q'R'T$ (9)

Here, $Q'=Q\Theta^H$, $R'=\Theta R$, where $\Theta$ denotes a conversion matrix expressing the lattice basis reduction conversion and H denotes a Hermitian codomain.

Next, the upper triangulation unit 156 will be described.

The upper triangulation unit 156 obtains an upper triangulation reception symbol vector by applying the unit matrix Q' calculated by the lattice basis reduction unit 154 to a reception symbol vector.

Next, the successive interference canceller 158 will be described.

The successive interference canceller 158 calculates an estimated transmission symbol vector from the upper triangulation reception symbol vector using the upper triangular matrix R' calculated by the lattice basis reduction unit 154 based on a SIC method.

Then, the quantizers 110 detect a lattice point vector by quantizing the estimated transmission symbol vector calculated by the successive interference canceller 158. Also, the basis converter 112 calculates a reproduction symbol vector by basis converting the lattice point vector to an original basis using the basis conversion matrix T. The candidate symbol selector 122 selects a candidate symbol vector for each bit included in a reproduction symbol. The basis inverse converter 124 basis converts the candidate symbol vector to a reduction basis using the basis conversion matrix T.

When the upper triangulation reception symbol vector is expressed as Equation 10, shown below, a minimum candidate symbol vector, in which a square error between the candidate symbol vector and the upper triangulation reception symbol vector at the reduction basis is the minimum, can be expressed as Equation 11, shown below.

Accordingly, the bit likelihood calculator 114 calculates the minimum candidate symbol vector based on Equation 11:

Upper Triangulation Reception Symbol Vector:
$$\bar{y}_t = (y_{t1}, y_{t2}, y_{t3}) \quad (10)$$

Minimum Candidate Symbol Vector:
$$\bar{p}_m = \underset{\bar{p}'}{\operatorname{argmin}} \|\bar{y}_t - R'\bar{p}'\| \quad (11)$$

The square error calculator 126 calculates a square error of the lattice point vector based on Equation 12 below, and simultaneously, calculates a square error of the minimum candidate symbol vector based on Equation 13. Upon receiving the calculation results, the difference calculator 130 can calculate the likelihood of each bit of the reproduction symbol being a "1" and a "0", respectively, using Equation 14 or Equation 15.

Square Error of Lattice Point Vector: $|\bar{e}_1|^2 = |\bar{y}_t - R'\bar{q}|^2$ (12)

Square Error of Minimum Candidate Symbol Vector: $|\bar{e}_0|^2 = |\bar{y}_t - R'\bar{p}_m^t|^2$ (13)

Here, $\bar{p}_m^t = T^{-1}\bar{p}_m^0$

Likelihood: $\lambda = |\bar{e}_1|^2 - |\bar{e}_0|^2$ (14)

Likelihood: $\lambda = \sqrt{|\bar{e}_1|^2} - \sqrt{|\bar{e}_0|^2}$ (15)

The likelihood calculated by applying the above processes to each modulation signal bit can be used to decode an error correction. By applying the communication apparatus according to an exemplary embodiment of the present invention, operational throughput in preceding portions of the bit likelihood calculator 114 can be decreased.

Hereinafter, effects obtained by applying exemplary embodiments of the present invention will be described with reference to FIG. 11.

Figure 11:
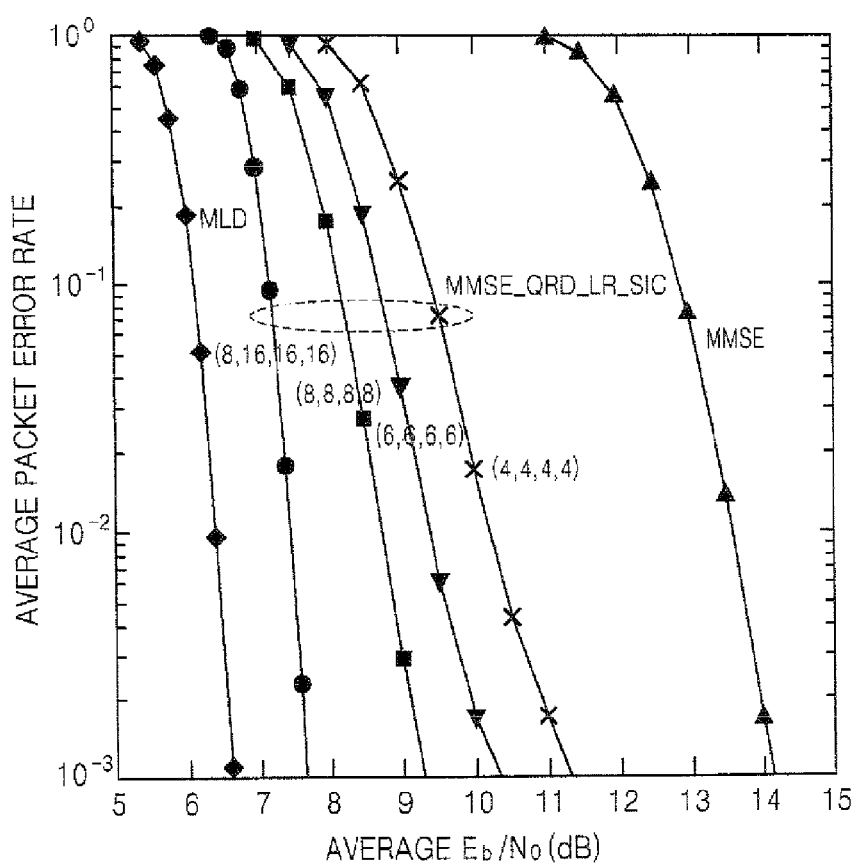
FIG. 11 is a graph comparing average packet error rate (PER) characteristics of the communication apparatus illustrated in FIG. 10 with characteristics of a related art communication apparatus.

FIG. 11 is a graph comparing average packet error rate (PER) characteristics of the communication apparatus illustrated in FIG. 10 and characteristics of a related art communication apparatus. In the data points ($n_1$, $n_2$, $n_3$, $n_4$) FIG. 11, $n_1$ is a number of candidate symbols including a logical negation bit and $n_2$, $n_3$, and $n_4$ are summed by adding numbers of estimated symbols in a modulation signal point corresponding to other transmission antennas and the numbers of candidate symbols around the estimated symbols. The number of antennas is 4, and four curves in the middle indicated by MMSE_QRD_LR_SIC are results obtained by applying the present inventive concept according to exemplary embodiments of the present invention. The curve on the left shows an average PER characteristic when a related art maximum likelihood detection (MLD) method is applied, and the curve on the right shows an average PER characteristic when a related art MMSE method is applied. Also, the horizontal axis indicates a ratio of average reception signal energy to noise power density, and the vertical axis indicates an average PER.

Referring to FIG. 11, exemplary embodiments according to the present invention have superior average PER characteristics compared to the related art MMSE method. Also, when the number of candidate symbols is increased, the average PER characteristics become similar to the average PER characteristics of the related art MLD method. Generally, using the related art MLD method, compared to the MMSE method or the SIC method, the ratio of average reception signal energy to noise power density per bit can be remarkably decreased, but operational throughput increases exponentially as the number of transmission antennas and modulation multi-level values of data modulation increase. Thus, the related art MLD method is not practical. However, exemplary embodiments of the present invention do not have the above problem, and can realize the average PER characteristic similar to the one obtained by using the related art MLD method.

Exemplary embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

The communication apparatus and the communication system according to exemplary embodiments of the present invention perform MIMO signal detection from a received modulation signal using a basis converted channel matrix and calculate a likelihood, used in decoding of an error correction, of each bit of a transmission symbol obtained via the MIMO signal detection. Accordingly, the performance of encoding and decoding used in an error correction of the transmission symbol can be increased, and as a result, communication quality increases.

While the present inventive concept has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A communication apparatus which receives through a transmission path a combined signal in which a plurality of modulated signals including transmission symbol information are combined, the communication apparatus comprising:
   a lattice basis reduction unit which converts a channel matrix indicating transmission characteristics of the transmission path using a basis conversion matrix;
   a transmission symbol estimation unit which estimates a transmission symbol from the received combined signal using the converted channel matrix;
   a bit likelihood calculator which calculates, at a reduced basis, a likelihood of each bit of the estimated transmission symbol being a predetermined value using an inverse matrix of the basis conversion matrix, the bit likelihood calculator comprising a candidate symbol selector selects a signal point including a logical negation bit of each bit of the estimated transmission signal as a candidate symbol corresponding to each bit of the estimated transmission signal; and a basis inverse converter which basis converts the selected candidate symbol using the inverse matrix of the basis conversion matrix.

2. The communication apparatus of claim 1, wherein the transmission symbol estimation unit comprises:

a signal detector which generates the estimated transmission symbol by estimating the transmission symbol from the received combined modulation signal using the converted channel matrix;

a quantizer which generates a lattice point symbol by quantizing the generated estimated transmission symbol; and a basis converter which generates a reproduction symbol by converting the generated lattice point symbol to an original basis using the basis conversion matrix.

3. The communication apparatus of claim 2, wherein the quantizer generates the lattice point symbol by quantizing signal points nearest to positions on a complex plane indicated by each component of the generated estimated transmission symbol.

4. The communication apparatus of claim 3, wherein the bit likelihood calculator comprises:

a square error unit which calculates a lattice point square error, which is a square of a distance between the lattice point symbol and the estimated transmission symbol, and calculates a candidate symbol square error, which is a square of a distance between the basis converted candidate symbol and the estimated transmission symbol;

a minimum value selector which selects a minimum square error of the selected candidate symbol corresponding to each bit from among calculated candidate symbol square errors; and a difference calculator which calculates the likelihood of the bit being a predetermined value by comparing the selected minimum square error and the calculated lattice point square error.

5. The communication device of claim 1, wherein the lattice basis reduction unit generates a lattice basis reduced unit matrix and lattice basis reduced upper triangular matrix of the channel matrix, the transmission symbol estimation unit generates a reproduction symbol from the received combined signal using the generated lattice basis reduced unit matrix and the lattice basis reduced upper triangular matrix, and the bit likelihood calculator calculates the likelihood of each bit of the generated reproduction symbol being a predetermined value, respectively, using the generated lattice basis reduced upper triangular matrix.

6. The communication apparatus of claim 1, wherein a determinant of the basis conversion matrix is 1.

7. The communication apparatus of claim 1, further comprising an error correction decoder which corrects errors of the estimated transmission symbol using the calculated likelihood.

8. A communication apparatus which receives through a transmission path a combined signal in which a plurality of modulated signals including transmission symbol information are combined, the communication apparatus comprising:

a lattice basis reduction unit which converts a channel matrix indicating transmission characteristics of the transmission path using a basis conversion matrix; a transmission symbol estimation unit which estimates a transmission symbol from the received combined signal using the converted channel matrix; and a bit likelihood calculator which calculates a likelihood of each bit of the estimated transmission symbol being a predetermined value, respectively, using an inverse matrix of the basis conversion matrix, wherein the bit likelihood calculator comprises:

a candidate symbol selector which selects a candidate symbol used in calculating the likelihood using the estimated transmission symbol; and a basis inverse converter which basis converts the selected candidate symbol using the inverse matrix of the basis conversion matrix, wherein the likelihood is calculated using the basis converted candidate symbol.

9. The communication apparatus of claim 8, wherein the bit likelihood calculator selects a minimum square error of the selected candidate symbols corresponding to each bit, from among square errors calculated on the basis converted candidate symbol, and calculates the likelihood of each bit of the transmission symbol being a predetermined value, respectively, by comparing the selected minimum square error and a square error of the estimated transmission symbol.

10. A communication method for receiving through a transmission path a combined signal in which a plurality of modulated signals, including transmission symbol information, are combined, the communication method comprising:

converting a channel matrix indicating transmission characteristics of the transmission path using a basis conversion matrix which converts column vectors forming the channel matrix to cross at right angles;

estimating a transmission symbol from the received combined signal using the converted channel matrix;

calculating, at a reduced basis, a likelihood of each bit of the estimated transmission symbol being a predetermined value using an inverse matrix of the basis conversion matrix, the calculating the likelihood comprises selecting a signal point including a logical negation bit of each bit of the estimated transmission symbol as a candidate symbol corresponding to each bit; and basis converting the selected candidate symbol using the inverse matrix of the basis conversion matrix.

11. The communication method of claim 10, further comprising correcting errors of the estimated transmission symbol using the calculated likelihood.

12. A non-transitory computer readable recording medium having recorded thereon a program for executing the method of claim 10.

13. A communication method for receiving through a transmission path a combined signal in which a plurality of modulated signals, including transmission symbol information, are combined, the communication method comprising:

converting a channel matrix indicating transmission characteristics of the transmission path using a basis conversion matrix which converts column vectors forming the channel matrix to cross at right angles;

estimating a transmission symbol from the received combined signal using the converted channel matrix; and calculating a likelihood of each bit of the estimated transmission symbol being a predetermined value, respectively, using an inverse matrix of the basis conversion matrix, wherein the calculating of the likelihood comprises:

selecting a candidate symbol used in calculating the likelihood using the estimated transmission symbol;

basis converting the selected candidate symbol using the inverse matrix of the basis conversion matrix; and calculating the likelihood using the basis converted candidate symbol.

14. The communication method of claim 13, further comprising selecting a signal point including a logical negation bit of each bit of the estimated transmission symbol as the selected candidate symbol corresponding to each bit.

15. A communication system capable of a multiple-input multiple-output (MIMO) transmission, the communication system comprising:
- a transmitter which generates a plurality of modulated signals modulated using a multilevel modulation method and transmits the modulated signals using a plurality of transmission antennas; and
- a receiver which receives a combined signal, wherein the modulated signals are combined through a plurality of reception antennas, and a transmission symbol included in the modulated signals is estimated from the combined signal, wherein the transmitter performs an encoding of error correction on each of a plurality of transmission data, generates the modulated signals corresponding to each of the plurality of transmission data with the error correction which is encoded, and transmits the modulated signals using the plurality of transmission antennas, and the receiver receives the combined signal through the plurality of reception antennas, converts a channel matrix indicating transmission characteristics of a transmission path using a basis conversion matrix, estimates the transmission symbol from the received combined signal using the converted channel matrix, calculates, at a reduced basis, a likelihood of each bit of the estimated transmission symbol being a predetermined value using an inverse matrix of the basis conversion matrix, the calculating the likelihood comprising selecting a signal point including a logical negation bit of each bit of the estimated transmission symbol as a candidate symbol corresponding to each bit, basis converting the selected candidate symbol using the inverse matrix of the basis conversion matrix, and performs decoding of the error correction based on the calculated likelihood.

\* \* \* \* \*